United States Patent
Belzile et al.

(10) Patent No.: US 8,459,983 B2
(45) Date of Patent: Jun. 11, 2013

(54) HOT-RUNNER SYSTEM HAVING CARBON NANOTUBES

(75) Inventors: Manon Danielle Belzile, Fairfield, VT (US); John Knapp, Jeffersonville, VT (US); Patrice Fabien Gaillard, Kitzing (FR); Edward Joseph Jenko, Essex, VT (US); Abdeslam Bouti, Swanton, VT (US); Paul Blais, South Burlington, VT (US); Brian Esser, Colchester, VT (US)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 51 days.

(21) Appl. No.: 13/382,174

(22) PCT Filed: Jul. 6, 2010

(86) PCT No.: PCT/US2010/041012
§ 371 (c)(1),
(2), (4) Date: Jan. 4, 2012

(87) PCT Pub. No.: WO2011/005724
PCT Pub. Date: Jan. 13, 2011

(65) Prior Publication Data
US 2012/0100243 A1 Apr. 26, 2012

Related U.S. Application Data

(60) Provisional application No. 61/223,724, filed on Jul. 8, 2009.

(51) Int. Cl.
*B29C 45/20* (2006.01)

(52) U.S. Cl.
USPC .................. 425/549; 264/328.8; 264/328.15; 425/572

(58) Field of Classification Search
USPC .................. 425/549, 572; 264/328.8, 328.15
See application file for complete search history.

(56) References Cited

U.S. PATENT DOCUMENTS

| | | | |
|---|---|---|---|
| 6,164,954 A | 12/2000 | Mortazavi et al. | |
| 6,860,314 B1 | 3/2005 | Koide et al. | |
| 7,134,868 B2 | 11/2006 | Guenther et al. | |
| 7,217,311 B2 | 5/2007 | Hong et al. | |
| 7,294,302 B2 * | 11/2007 | Koide et al. | 264/328.8 |
| 7,691,314 B2 * | 4/2010 | Ae et al. | 264/328.11 |
| 7,935,737 B2 * | 5/2011 | Gopal et al. | 521/48.5 |
| 8,304,481 B2 * | 11/2012 | Nakamura et al. | 524/451 |
| 2003/0145973 A1 | 8/2003 | Gellert et al. | |
| 2004/0097360 A1 | 5/2004 | Benitsch et al. | |
| 2006/0032243 A1 | 2/2006 | Chen | |
| 2008/0099176 A1 | 5/2008 | Czerwinski | |
| 2008/0206391 A1 | 8/2008 | Bouti et al. | |
| 2008/0223539 A1 | 9/2008 | Cooper et al. | |
| 2008/0241298 A1 | 10/2008 | Fischer et al. | |
| 2008/0274229 A1 | 11/2008 | Barnett | |

* cited by examiner

*Primary Examiner* — Tim Heitbrink

(57) ABSTRACT

A hot-runner system for use with an injection molding system, the hot-runner system including a hot-runner component, a material; and carbon nanotubes being combined with the material. The carbon nanotubes are dispersed, at least in part, in the material and the material includes a metal alloy. The carbon nanotubes are dispersed in the metal alloy, so that the metal alloy and the carbon nanotubes are combined to form a CNT-metal composite material.

15 Claims, No Drawings

HOT-RUNNER SYSTEM HAVING CARBON NANOTUBES

TECHNICAL FIELD

The present invention generally relates to hot-runner systems of injection-molding systems; more specifically, the present invention generally relates to a hot-runner system of an injection-molding system, in which the hot-runner system includes a hot-runner component having a material and having carbon nanotubes combined with the material.

BACKGROUND

Examples of known molding systems are (amongst others): (i) the HYPET (TRADEMARK) Molding System, (ii) the QUADLOC (TRADEMARK) Molding System, (iii) the HYLECTRIC (TRADEMARK) Molding System, and (iv) the HYMET (TRADEMARK) Molding System, all manufactured by Husky Injection Molding Systems (Head Office Location: Canada).

An example of a manufacturer of carbon nanotubes (also referred to as "CNT") or CNT-composite materials is: Bioneer Corporation, located in Korea (telephone in Korea +82-42-930-8777 or in the U.S.A. 1-877-264-4300). An example of an academic facility that studies nanotechnology is the Birck Nanotechnology Center of Purdue University, located in U.S.A. (telephone 765-494-7053). Examples of research organizations involved in the research of nanotechnology are: (i) National Nanotechnology Infrastructure Network (NNIN), (ii) Nano Science and Technology Institute (NSTI) located in U.S.A. (telephone 508-357-2925), and (iii) Polytech & Net GmbH located in Germany (telephone: +49 (0)6196-8845027). Organizations providing news and information about nanotechnology may be found at the following web sites: (i) www.azonano.com, (ii) www.nanotech-now.com, (iii) www.nanowerk.com and (iv) www.nanohub.org.

U.S. Pat. No. 6,164,954 (Inventor: MORTAZAVI et al.: Publication Date: Dec. 26, 2000) discloses an injection nozzle apparatus that comprises inner and outer body portions. The inner body portion includes a melt channel and the outer body is made of a pressure resistant material. The ratio between the inner diameter of the outer body portion and the outer diameter of the inner body portion is selected so that a pre-load or a load is generated when assembling the outer body over the inner body. Preferably the assemble of the two bodies is removably fastened to an injection nozzle body. Preferably the inner body comprises a material with wear resistant characteristics to withstand abrasive or corrosive molten materials. The apparatus of the present invention is particularly useful in molding machines and hot runner nozzles for high pressure molding of various materials at normal or elevated injection temperatures.

United States Patent Application Number 2003/0145973 (Inventor: GELLERT et al.: Publication Date: Aug. 7, 2003) discloses improved heated manifolds, heaters and nozzles for injection molding, having a high strength metal skeleton infiltrated with a second phase metal having higher thermal conductivity. Also disclosed is method of forming a manifold, heater or nozzle preform and infiltrating the preform with a highly thermally conductive material. The invention also provides a method of simultaneously infiltrating and brazing injection molding components of similar or dissimilar materials together.

U.S. Pat. No. 7,134,868 (Inventor: GUENTHER et al.: Publication Date: Nov. 14, 2006) discloses an injection molding nozzle with a tip portion in the gate area of the mold that has a wear-resistant diamond-type coating. The surface of the tip melt channel that delivers melt to the gate area may also comprise a diamond-type coating. Nozzle seal surfaces in the gate area may also comprise a diamond-type coating. The enhanced harness, smoothness and thermal conductivity of these coated surfaces results in higher quality molded parts, and easier to clean molding equipment that has a longer service life.

U.S. Pat. No. 7,217,311 (Inventor: HONG et al.; Published: May 15, 2007) discloses manufacture of a carbon nanotube reinforced metal nano composite powder for use as grinding agent. The manufacture involves performing ultrasonication of a solution having a nanotube and a metal salt compound, calcining the solution, and reducing the composite powder.

United States Patent Application Number 2006/0032243 (Inventor: GA-LANE CHEN; Published: Feb. 16, 2006) discloses an injection molding device includes an injection unit (10), a lock unit, and a control unit. The injection unit includes a mold (11, 11') and a cooling system. The cooling system includes one or more pipeways (18, 18') in the mold, and a coolant received in the pipeways. The coolant is a superfluid with carbon nanotubes suspended therein. A coefficient of viscosity of the superfluid is virtually zero, therefore friction between the superfluid and the nanotubes is extremely small. This enables the nanotubes in the superfluid in the pipeways to undergo more turbulent flow, so that the nanotubes can conduct more heat from the mold. In addition, the nanotubes themselves have high thermal conductivity. Accordingly, the thermal conductivity of the cooling system is enhanced. Thus, the molten material injected into the mold can be cooled and solidified fast. This provides the injection molding device with a high molding efficiency.

United States Patent Application Number 2008/0099176 (Inventor: CZERWINSKI; Publication Date: May 1, 2001) discloses a molding material handling component for a metal molding system that has a component body made from an alloy that is made contactable against molten metallic molding material including molten alloy of magnesium.

United States Patent Application Number 20080206391 (Inventor: BOUTI et al.; Publication Date: Aug. 28, 2008) discloses a nozzle assembly for an injection molding assembly has a nozzle housing having a melt channel extending therethrough, a nozzle tip, and a retainer that retains the nozzle tip against the nozzle housing. The nozzle tip is formed of a precipitation hardened, high thermal conductivity material and a precipitation hardened, high strength material, which are integrally joined together to form the body. The thermal conductivity of the high thermal conductivity material is greater than the thermal conductivity of the high strength material, and the strength of the high strength material is greater than the strength of the high thermal conductivity material. The high thermal conductivity material and the high strength material can be precipitation hardened together under the same precipitation hardening conditions to achieve increases in the value of at least one strength aspect of the high thermal conductivity material and the value of at least one strength aspect of the high strength material.

The current state of the art provides known hot-runners that are in many cases performance limited by material properties (such as, strength and thermal conductivity and/or wear resistance) associated with hot-runner components that include standard metal alloys, such as: PH13-8 (stainless-steel alloy), BeCu (beryllium copper alloy), 4140 (steel alloy), Aermet 100 (carbon bearing high strength alloy), H13 (tool and die steel alloy), etc.

SUMMARY

According to a general aspect of the present invention, there is generally provided (but is not limited to the following technical features): a hot-runner system of an injection molding system, in which the hot-runner system includes (but is not limited to): a hot-runner component having (but not is limited to): a material, and carbon nanotubes combined with the material. Other additional arrangements of technical features are described in the Detailed Description of the Non-limiting Embodiments provided below. The carbon nanotubes are hereafter referred to, from time to time, as "CNT" or "CNTs". A technical effect associated with the general aspect of the present invention is that the CNTs improve material properties, such as (but is not limited to) longevity and performance, of the material of the hot-runner component in comparison to known and/or existing hot-runner components.

DETAILED DESCRIPTION OF THE
NON-LIMITING EMBODIMENTS

Generally, a hot-runner system is used with an injection molding system; the hot-runner system includes hot-runner components (that are made with materials) that are known to persons skilled in the art, and these known components (and/or materials) will not be described here; these known components are described, at least in part, in the following reference books, for example: (i) "*Injection Molding Handbook*" authored by OSSWALD/TURNG/GRAMANN (ISBN: 3-446-21669-2), (ii) "*Injection Molding Handbook*" authored by ROSATO AND ROSATO (ISBN: 0-412-99381-3), (iii) "*Injection Molding Systems*" $3^{rd}$ Edition authored by JOHANNABER (ISBN 3-446-17733-7) and/or (iv) "*Runner and Gating Design Handbook*" authored by BEAUMONT (ISBN 1-446-22672-9).

First Non-Limiting Embodiment

In accordance with the first non-limiting embodiment, the hot-runner system includes (but is not limited to): a hot-runner component having (but is not limited to): (i) a material, and (ii) carbon nanotubes (CNTs) combined with the material. The material may include, for example (but is not limited to): a metal alloy, and/or a ceramic component, etc. The definition for "combined" is as follows: to put or bring or join together so as to form a unit, and/or to put or bring into close association or relationship, and/or to make or join or unite into one, and/or to come or bring into union, and/or to act or to mix together; for example: CNTs may be: (i) formed in the material of the hot-runner component, (ii) added to the hot-runner component by a deposition method, and/or (iii) coated to the hot-runner component.

Second Non-Limiting Embodiment

In accordance with the second non-limiting embodiment, the hot-runner system (of the first embodiment) is modified, such that the CNTs are dispersed, at least in part, in the material. In an alternative of the second embodiment, the material includes a metal alloy, and the CNTs are dispersed in the metal alloy, so that the metal alloy and the CNTs are combined to form a CNT-metal composite material. Examples of the metal alloy are described below. In another alternative of the second embodiment, the material includes a ceramic material, and the CNTs are dispersed in the ceramic material, so that the ceramic material and the CNTs combine form a CNT-based ceramic composite. Examples of the ceramic material are described below. The definition of "dispersed" is as follows: the CNTs are distributed or dissipated, more or less, evenly or not evenly, through the material (in part or completely). It is understood that the CNTs may be implemented or included, for example, in the material to form a composite material that is used in or is part of the hot-runner component, and in this arrangement the composite material may be called: (i) a CNT-metal composite (if the material includes the metal alloy), or (ii) a CNT-ceramic composite (if the material includes the ceramic material).

Third Non-Limiting Embodiment

In accordance with the third non-limiting embodiment, the hot-runner system (of the first embodiment) is modified, such that the CNTs are dispersed, at least in part, in a coating, and the coating surrounds, at least in part, the material. Examples of the coating are described below. In an alternative of the third embodiment, the CNTs are dispersed, at least in part, in the coating, and the coating includes the metal alloy, so that the CNTs and the coating are combined to form the CNT-metal coating. In another alternative of the third embodiment, the CNTs are dispersed, at least in part, in the coating, the coating includes the ceramic material, so that the CNTs and the coating form the CNT-ceramic coating. It is understood that the CNTs may be implemented or included, for example, in the coating to form a composite material that is used in or is part of the hot-runner component, and in this arrangement the composite material may be called: (i) a CNT-metal coating (if the coating includes the metal alloy), or (ii) a CNT-ceramic coating (if the coating includes the ceramic material). Another definition of "dispersed" is as follows: the CNTs are distributed or dissipated in the coating that is applied to the material.

Fourth Non-Limiting Embodiment

In accordance with the fourth non-limiting embodiment, the hot-runner system (of the first embodiment) is modified, such that: (i) the CNTs are dispersed, at least in part, in the material, and (ii) the CNTs are dispersed, at least in part, in the coating, and the coating surrounds, at least in part, the material. The fourth embodiment is a combination of the second embodiment and the third embodiment. Yet another definition of "dispersed" is as follows: (i) the CNTs are distributed or dissipated, more or less, evenly or not evenly, through the material (in part or completely), (ii) the CNTs are distributed or dissipated in the coating that is applied to the material, or (iii) both (i) in combination with (ii).

Carbon Nanotubes (CNTs)

CNTs are related to graphite. CNTs possess the following mechanical properties: (i) high tensile strength, (ii) highly flexible (can be bent considerably without damage), (iii) highly elastic (approximately 18% elongation to failure), (iv) high thermal conductivity, (v) low thermal expansion coefficient, (vi) high aspect ratio (length is approximately 1000 time the size of the diameter), (vii) high wear resistance, (viii) hydrophobic coating, (ix) low friction coating. The molecular structure of graphite resembles stacked, one-atom-thick sheets of chicken wire; this arrangement provides a planar network of interconnected hexagonal rings of carbon atoms. In conventional graphite, the sheets of carbon are stacked on top of one another, allowing them to easily slide over each other. This is the reason why graphite is not hard but feels greasy, and may be used as a lubricant. When graphite sheets are rolled into a cylinder and their edges joined, they form CNTs. Only the tangents of the graphitic planes come into contact with each other, and hence their properties are more like those of a molecule. CNTs come in a variety of diameters, lengths and functional-group content. The CNTs may include a tube of graphite, a one-atom thick single-wall nanotube, or a number of concentric tubes called multi-walled CNTs. When viewed with a transmission electron microscope, CNTs appear as planes, whereas single walled CNTs appear as two planes; in multi walled CNTs more than two planes are observed, and can be seen as a series of parallel lines. There are different types of CNTs because the graphitic sheets can be rolled in different ways. There are three types of CNTs:

Zigzag, Armchair, and Chiral. It is possible to recognize zigzag, armchair, and chiral CNTs just by following the pattern across the diameter of the tubes, and analyzing their cross-sectional structure. When CNTs crosses grain boundaries, the CNTS act as anchors between adjacent and distant grains and the result is a structure for the hot-runner component that is tougher than conventionally-used materials. Also, because of their high thermal conductivity, a CNT-metal composite also has higher overall thermal conductivity than the base alloys into which they are dispersed in.

Functionalization of CNTs

CNTs are insoluble in many liquids such as water, polymer resins, and most solvents. Thus CNTs may be difficult to evenly disperse in a liquid matrix such as epoxies and other polymers. Functionalization is a process for making "functionalized" CNTs (that is, functionalized carbon nanotubes are CNTs that have been processed so as to become more easily dispersible in liquids, etc.). The process of functionalization includes physically and/or chemically attaching certain molecules or functional groups with the smooth sidewalls of the CNTs without significantly changing the desirable properties associated with CNTs. The production of robust composite materials requires sufficiently strong covalent chemical bonding between filler particles and the material matrix, rather than much weaker van der Waals physical bonds which occur if the CNTs are not properly functionalized. Examples of functionalization methods include (but not limited to): chopping, oxidation, and "wrapping" of the CNTs. Functionalization methods can create more active bonding sites on the surface of the CNTs.

CNT-Metal Composite or CNT-Ceramic Composite

The CNT-metal composite may also be called a CNT-metal powder; examples of the CNT-metal composite are as follows: a CNT-copper alloy, a CNT-nickel alloy, a CNT-aluminum alloy, a CNT-steel alloy including stainless, etc. The CNT-metal composite has technical advantages, such as: (i) higher conductivity and higher strength for the hot-runner component, such as (but not limited to): nozzle tips, manifolds, and/or (ii) higher wear resistance for the hot-runner component, such as (but not limited to): bushings, nozzles, stems, tips, screws, valves. An example of the CNT-Metal powder is manufactured by Bioneer (located in South Korea). The CNT- based ceramic is formed by dispersing CNTs into a ceramic material, such as oxides (alumina, zirconia, etc), non-oxides (carbides, borides, nitrides and silicides) or composites (particulate reinforced oxides and non-oxides composites).

CNT-Metal Coating or CNT-Ceramic Coating

The CNT-metal coating is a coating that includes the metal alloy in combination with the CNTs. The CNT-ceramic coating is a coating that includes the ceramic material in combination with the CNTs. A technical effect for using the CNT-metal coating and/or the CNT ceramic coating with the hot-runner component is (but is not limited to): (i) reduced wear, such as (but not limited to): gate, tips, stems, nozzles, gate inserts, mold slides (ii) improved resin flow (such as a manifold channel), (iii) reduced weepage (such as, but not limited to, valve bushings), (iv) improved hydrophobic properties, such as (but not limited to): a stem and/or a bushing, (v) a lower friction coating for use with the hot-runner component, such as (but not limited to): piston cylinders.

Hot-Runner Components

Examples of the hot-runner component that may include a CNT-composite material and/or a CNT-based coating in the following hot-runner components (but not limited to): a nozzle tip, a nozzle housing, a manifold, a melt channel defined by the manifold, a bushing, a manifold bushing, a sprue bushing, a valve stem, a mold gate insert, a screw, a valve, a stem bushing, a mold slide, a piston cylinder, etc.

Functional Grading

In accordance with a variant of any of the embodiments and alternatives described above, the CNT-Metal Composite or CNT-Ceramic Composite and/or the CNT-Metal Coating or CNT-Ceramic Coating is functionally graded by varying the amount of CNTs and/or the amount of the particles of ceramics and/or the amount of the metal alloy, through the hot-runner component so that a property of (or properties of) the hot-runner component is varied, at least in part, through the hot-runner component. For example, the CNTs, and/or the material (the metal alloy and/or the ceramic material), and/or the coating are functionally graded through the hot-runner component. For example, the hot-runner component may have: (i) an end portion that includes a higher amount of CNTs mixed with a copper alloy powder so that a higher thermal conductivity may be realized, (ii) an inner diameter of a passageway defined in the hot-runner component is coated with the ceramic material combined with the CNTs so that the thermal insulation and the strength of the passageway and may be improved, (iii) a core that includes a carbon steel alloy combined with the CNTs so that improved strength may be realized, and (iv) an other end portion that includes only the ceramic material that include no CNTs so that improved insulation may be realized while using a lower cost item.

The description of the non-limiting embodiments provides non-limiting examples of the present invention; these non-limiting examples do not limit the scope of the claims of the present invention. The non-limiting embodiments described are within the scope of the claims of the present invention. The non-limiting embodiments described above may be: (i) adapted, modified and/or enhanced, as may be expected by persons skilled in the art, for specific conditions and/or functions, without departing from the scope of the claims herein, and/or (ii) further extended to a variety of other applications without departing from the scope of the claims herein. It is understood that the non-limiting embodiments illustrate the aspects of the present invention. Reference herein to details and description of the non-limiting embodiments is not intended to limit the scope of the claims of the present invention. Other non-limiting embodiments, which may not have been described above, may be within the scope of the appended claims. It is understood that: (i) the scope of the present invention is limited by the claims, (ii) the claims themselves recite those features regarded as essential to the present invention, and (ii) preferable embodiments of the present invention are the subject of dependent claims. Therefore, what is protected by way of letters patent are limited only by the scope of the following claims:

The invention claimed is:

1. A hot-runner system for use with an injection molding system, the hot-runner system comprising:
a hot-runner component, including:
a material selected from the group consisting of a metal alloy and a ceramic alloy; and
carbon nanotubes being combined with the material.

2. The hot-runner system of claim 1, wherein:
the carbon nanotubes are dispersed, at least in part, in the material.

3. The hot-runner system of claim 2, wherein:
the carbon nanotubes are dispersed in the metal alloy, so that the metal alloy and the carbon nanotubes are combined to form a CNT-metal composite material.

4. The hot-runner system of claim 2, wherein:
the carbon nanotubes are dispersed in the ceramic material, so that the ceramic material and the carbon nanotubes are combined to form a CNT-based ceramic composite.

5. The hot-runner system of claim 1, wherein:
the carbon nanotubes are dispersed, at least in part, in a coating, the coating surrounding, at least in part, the material.

6. The hot-runner system of claim 5, wherein:
the carbon nanotubes are dispersed, at least in part, in the coating, and the coating includes a metal alloy, so that the carbon nanotubes and the coating are combined to form a CNT-metal coating.

7. The hot-runner system of claim 5, wherein:
the carbon nanotubes are dispersed, at least in part, in the coating, and the coating includes a ceramic material, so that the carbon nanotubes and the coating are combined to form a CNT-ceramic coating.

8. The hot-runner system of claim 1, wherein:
the carbon nanotubes are dispersed, at least in part, in the material; and
the carbon nanotubes are dispersed, at least in part, in a coating, the coating surrounding, at least in part, the material.

9. The hot-runner system of claim 1, wherein:
the carbon nanotubes are functionally graded through the material so that a property of the hot-runner component is varied through the hot-runner component.

10. The hot-runner system of claim 1, wherein:
the carbon nanotubes are functionally graded through the material so that a property of the hot-runner component is varied through the hot-runner component; and
the material is functionally graded through the hot-runner component so that another property of the hot-runner component is varied through the hot-runner component.

11. The hot-runner system of claim 1, wherein:
the carbon nanotubes are dispersed, at least in part, in a coating, the coating surrounding, at least in part, the material; and
the carbon nanotubes are functionally graded through the coating so that a property of the hot-runner component is varied through the hot-runner component.

12. The hot-runner system of claim 1, wherein:
the carbon nanotubes are functionally graded through the material so that a property of the hot-runner component is varied through the hot-runner component;
the material is functionally graded through the hot-runner component so that another property of the hot-runner component is varied through the hot-runner component;
the carbon nanotubes are dispersed, at least in part, in a coating, the coating surrounding, at least in part, the material; and
the carbon nanotubes are functionally graded through the coating so that yet another property of the hot-runner component is varied through the hot-runner component.

13. The hot-runner system of claim 1, wherein:
the carbon nanotubes includes functionalized carbon nanotubes.

14. The hot-runner system of claim 1, wherein:
the hot-runner component includes any one of:
   a nozzle tip,
   a nozzle housing,
   a manifold,
   a melt channel defined by the manifold,
   a bushing,
   a manifold bushing,
   a sprue bushing,
   a valve stem,
   a mold gate insert,
   a screw,
   a valve,
   a stem bushing,
   a mold slide, and
   a piston cylinder.

15. An injection molding system, comprising:
a hot-runner system, including:
   a hot-runner component, including:
      a material selected from the group consisting of a metal alloy and a ceramic alloy; and
      carbon nanotubes being combined with the material.

* * * * *